United States Patent
Bassett et al.

(10) Patent No.: US 8,341,662 B1
(45) Date of Patent: Dec. 25, 2012

(54) USER-CONTROLLED SELECTIVE OVERLAY IN A STREAMING MEDIA

(75) Inventors: Ronald W. Bassett, Pflugerville, TX (US); Bruce A. Beadle, Round Rock, TX (US); Michael Wayne Brown, Georgetown, TX (US); Leon P. Doud, Austin, TX (US); Michael A. Paolini, Round Rock, TX (US)

(73) Assignee: International Business Machine Corporation, Armonk, NY (US)

( * ) Notice: Subject to any disclaimer, the term of this patent is extended or adjusted under 35 U.S.C. 154(b) by 1396 days.

(21) Appl. No.: 09/409,594

(22) Filed: Sep. 30, 1999

(51) Int. Cl.
*H04N 7/10* (2006.01)
*H04N 7/025* (2006.01)

(52) U.S. Cl. ............... 725/32; 725/87; 725/93; 725/98; 725/139; 375/240.26; 375/240.27; 375/240.28

(58) Field of Classification Search .......... 725/87, 725/93, 98, 139, 32, 116, 118, 146, 148; 375/240.26, 240.27, 240.28; 370/509, 512
See application file for complete search history.

(56) References Cited

U.S. PATENT DOCUMENTS

| | | | | |
|---|---|---|---|---|
| 4,316,285 A | * | 2/1982 | Bobilin et al. ............... | 370/512 |
| 4,847,698 A | * | 7/1989 | Freeman ........................ | 386/99 |
| 4,847,699 A | * | 7/1989 | Freeman ........................ | 386/99 |
| 4,847,700 A | * | 7/1989 | Freeman ........................ | 386/99 |
| 5,068,733 A | | 11/1991 | Bennett ........................ | 358/181 |
| 5,144,663 A | * | 9/1992 | Kudelski et al. ............. | 380/230 |
| 5,168,356 A | * | 12/1992 | Acampora et al. ........ | 375/240.15 |
| 5,195,092 A | | 3/1993 | Wilson et al. ................ | 370/94.2 |
| 5,258,843 A | | 11/1993 | Truong ........................ | 358/183 |
| 5,408,465 A | | 4/1995 | Gusella et al. .................. | 370/17 |
| 5,422,674 A | | 6/1995 | Hooper et al. ................ | 348/409 |
| 5,491,517 A | | 2/1996 | Kreitman et al. ............. | 348/581 |
| 5,508,732 A | | 4/1996 | Bottomley et al. ............... | 348/7 |

(Continued)

FOREIGN PATENT DOCUMENTS

CA 2250450 4/1999

(Continued)

OTHER PUBLICATIONS

International Business Machines Corporation; Technical Disclosure Bulletin; vol. 40, No. 10; Oct. 1997; Structured Metadata for Application Specific Viewers for Streamed Internet Video/Audio; pp. 123-127.

(Continued)

*Primary Examiner* — Jason Salce
(74) *Attorney, Agent, or Firm* — Yee & Associates, P.C.; Jeffrey S. LaBaw

(57) ABSTRACT

A method and system for tailoring a multimedia presentation of an event on a computerized multimedia system to meet a user's desires. In a preferred embodiment, a set of video streams and a set of audio streams for the event are provided to the user via a network coupled to the multimedia system. From the set of available video streams for the event, one or more video streams are selected for presentation to the user. From the set of available audio streams for the event, one or more audio streams are selected for presentation to the user. Furthermore, the relative volumes of the different audio streams may be adjusted. In response to user input, the selected video and audio streams are assigned to respective portions of video and audio output devices. The event is presented to the user according to the selected video stream assignments.

42 Claims, 5 Drawing Sheets

U.S. PATENT DOCUMENTS

| | | | |
|---|---|---|---|
| 5,543,856 A | 8/1996 | Rosser et al. | 348/578 |
| 5,548,704 A | 8/1996 | Steiner et al. | 395/158 |
| 5,548,726 A | 8/1996 | Pettus | 395/200.09 |
| 5,557,724 A | 9/1996 | Sampat et al. | 395/157 |
| 5,568,167 A | 10/1996 | Galbi et al. | 348/589 |
| 5,592,233 A | 1/1997 | Koz | 348/552 |
| 5,594,507 A | 1/1997 | Hoarty | 348/584 |
| 5,600,368 A | 2/1997 | Matthews, III | 348/143 |
| 5,611,038 A | 3/1997 | Shaw et al. | 395/806 |
| 5,630,067 A | 5/1997 | Kindell et al. | 395/200.09 |
| 5,652,615 A | 7/1997 | Bryant et al. | 348/9 |
| 5,671,377 A | 9/1997 | Bleidt et al. | 395/328 |
| 5,724,091 A | 3/1998 | Freeman et al. | |
| 5,778,184 A | 7/1998 | Brownmiller et al. | |
| 5,778,187 A | 7/1998 | Monteiro et al. | |
| 5,781,227 A | 7/1998 | Goode et al. | 348/7 |
| 5,790,815 A | 8/1998 | Swanstrom et al. | 395/309 |
| 5,794,018 A | 8/1998 | Vrvilo et al. | 395/551 |
| 5,826,165 A | 10/1998 | Echeita et al. | 455/2 |
| 5,838,678 A | 11/1998 | Davis et al. | 370/389 |
| 5,848,396 A | 12/1998 | Gerace | |
| 5,856,973 A | 1/1999 | Thompson | 370/389 |
| 5,859,660 A | 1/1999 | Perkins et al. | 348/9 |
| 5,861,881 A * | 1/1999 | Freeman et al. | 715/500.1 |
| 5,864,682 A | 1/1999 | Porter et al. | 395/200.77 |
| 5,867,799 A | 2/1999 | Lang et al. | 707/1 |
| 5,872,588 A | 2/1999 | Aras et al. | 348/1 |
| 5,877,755 A | 3/1999 | Hellhake | |
| 5,892,754 A | 4/1999 | Kompella et al. | 370/236 |
| 5,893,091 A | 4/1999 | Hunt et al. | |
| 5,901,287 A | 5/1999 | Bull et al. | |
| 5,917,559 A * | 6/1999 | Um | 375/240.26 |
| 5,918,014 A | 6/1999 | Robinson | |
| 5,931,901 A | 8/1999 | Wolfe et al. | |
| 6,002,394 A | 12/1999 | Schein et al. | |
| 6,014,694 A * | 1/2000 | Aharoni et al. | 709/219 |
| 6,018,659 A | 1/2000 | Ayyagari et al. | |
| 6,044,376 A | 3/2000 | Kurtzman, II | |
| 6,047,327 A | 4/2000 | Tso et al. | |
| 6,057,833 A * | 5/2000 | Heidmann et al. | 345/726 |
| 6,088,722 A | 7/2000 | Herz et al. | |
| 6,097,441 A * | 8/2000 | Allport | 348/552 |
| 6,122,263 A | 9/2000 | Dahlin et al. | |
| 6,144,375 A | 11/2000 | Jain et al. | |
| 6,154,745 A | 11/2000 | Kari et al. | |
| 6,236,805 B1 * | 5/2001 | Sebestyen | 386/98 |
| 6,285,317 B1 | 9/2001 | Ong | |
| 6,366,298 B1 | 4/2002 | Haitsuka et al. | |
| 6,493,832 B1 * | 12/2002 | Itakura et al. | 713/600 |
| 6,553,178 B2 | 4/2003 | Abecassis | |
| 6,578,201 B1 * | 6/2003 | LaRocca et al. | 725/86 |
| 6,675,386 B1 * | 1/2004 | Hendricks et al. | 725/105 |
| 6,801,944 B2 | 10/2004 | Motoyama et al. | |
| 7,010,492 B1 | 3/2006 | Bassett et al. | |

FOREIGN PATENT DOCUMENTS

| | | |
|---|---|---|
| EP | 692911 A2 | 1/1996 |
| EP | 805600 A2 | 11/1997 |
| EP | 0847156 A2 | 6/1998 |
| GB | 2 313 755 A | 12/1997 |
| GB | 2327837 | 2/1999 |
| GB | 2327837 A | 2/1999 |
| GB | 2 338 388 A | 12/1999 |
| JP | 10257050 | 9/1998 |
| JP | 11512903 | 11/1999 |
| WO | 9617467 A2 | 6/1996 |
| WO | 9712486 A1 | 4/1997 |
| WO | 9721183 A1 | 6/1997 |
| WO | 9841020 A1 | 9/1998 |
| WO | 9904561 A1 | 1/1999 |
| WO | 9930493 A1 | 6/1999 |
| WO | 9945702 A1 | 9/1999 |

OTHER PUBLICATIONS

International Business Machines Corporation; Technical Disclosure Bulletin; vol. 39, No. 02, Feb. 1996; Analog Interactive Television System with Two Service Levels; pp. 157-161.

International Business Machines Corporation; Technical Disclosure Bulletin; vol. 36, No. 09B, Sep. 1993; Resource Management System for Multimedia Devices; pp. 525-529.

International Business Machines Corporation; Technical Disclosure Bulletin; vol. 39, No. 08, Aug. 1996; User Guided Selection or Elimination of Identified Information in Video Sequence; pp. 141-146.

Krunz, M. et al.; Scheduling and Bandwidth Allocation for the Distribution of Archived Video in VOD Systems; Telecommunication Systems—Modeling, Analysis, Design and Management; vol. 9, No. 3-4, pp. 335-355, 1998.

Ng Jky et al.; A Distributed MPEG Video Player System With Feedback and QoS Control; Proceeding Fifth International Conference on Real-Time Computing Systems and Applications pp. 91-100; 1998.

Zhu Xiaomin et al.; Fuzzy Scheduling of Coupled Customers to a Queueing Network with Parallel Servers; Journal of Systems Science and Systems Engineering vol. 7, No. 4, pp. 482-487; Dec. 1998.

Mielke M. et al.; A Multi-Level Buffering and Feedback Scheme for Distributed Multimedia Presentation Systems; Proceedings $7^{th}$ International Conference on Computer Communications and Networks; pp. 219-226; 1998.

Curtis, P. et al.; Secure Multimedia Coordination System for Plural Network Users Supports Plural Levels of Communication by Dynamically Controlling Channels of Data, With Central Server Connected to Client Work Stations; Jan. 16, 1996.

Zon Yin Shae et al.; Capture and Playback Synchronization in Video Conferencing; Proceedings of the SPIE—The International Society for Optical Engineering, vol. 2417, pp. 90-101,, 1995.

Sugh Hoon Lee et al.; Retransmission Scheme for MPEG Streams in Mission Critical Multimedia Applications; Proceedings $24^{th}$ Euromicro Conference vo. 2, pp. 574-580; 1998.

Galbi, D. et al.; An MPEG-1 Audio/Video Decoder with Run Length Compressed Antialiased Video Overlays; 1995 IEEE International Solid-State Circuits Conference. Digest of Technical Papers, pp. 286-287, 381; 1995.

Coden, MH.; Switch Ethernet Revamps Ad Insertion; CED, vol. 24, No. 4, pp. 62,64,66,68, Apr. 1998.

McGrath, E.; Digital Insertion of Advertising into a Digital Stream (DID); International Broadcasting Convention, Sep. 1997, pp. 258-261.

Smirnov, MI; Efficient Multicast Routing in High Speed Networks; Computer Communications vol. 19, No. 1, pp. 59-75, Jan. 1996.

Malinovski, T. et al.; Design of Multimedia Presentation Using Synchronized Video, Animation and Sound Streams; Proceedings of the $17^{th}$ International Conference on Information Technology Interfaces, pp. 495-500, 1995.

Gallagher et al., "A Framework for Targeting Banner Advertising on the Internet," Proceedings of the 30th Annual Hawaii International Conference on System Sciences, Maui, Hawaii, Jan. 7-10, 1997, pp. 265-274.

Lambert, "Bell Atlantic Installs Multimedia Network Software," Multichannel News, pp. 23, Jan. 3, 1994.

Bassett et al., "Method and Apparatus for Dynamic Targeting of Streaming Media Using Statistical Data," U.S. Appl. No. 09/409,601, filed Sep. 30, 1999, 54 pages.

Office Action regarding U.S. Appl. No. 09/409,601, dated Nov. 26, 2001, 20 pages.

Office Action regarding U.S. Appl. No. 09/409,601, dated May 14, 2002, 13 pages.

Office Action regarding U.S. Appl. No. 09/409,601, dated Nov. 6, 2002, 11 pages.

Office Action regarding U.S. Appl. No. 09/409,601, dated Apr. 11, 2003, 12 pages.

Final Office Action regarding U.S. Appl. No. 09/409,601, dated Sep. 22, 2003, 15 pages.

Office Action regarding U.S. Appl. No. 09/409,601, dated Nov. 26, 2003, 11 pages.

Final Office Action regarding U.S. Appl. No. 09/409,601, dated May 6, 2004, 12 pages.

* cited by examiner

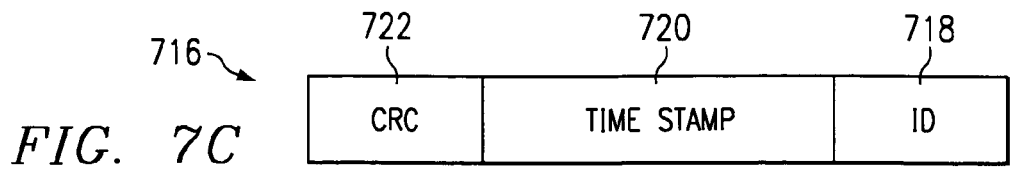
FIG. 7C
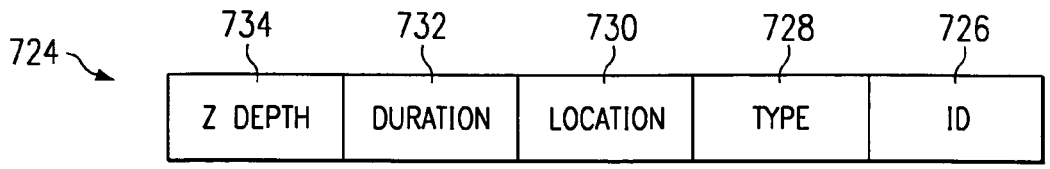
FIG. 7D
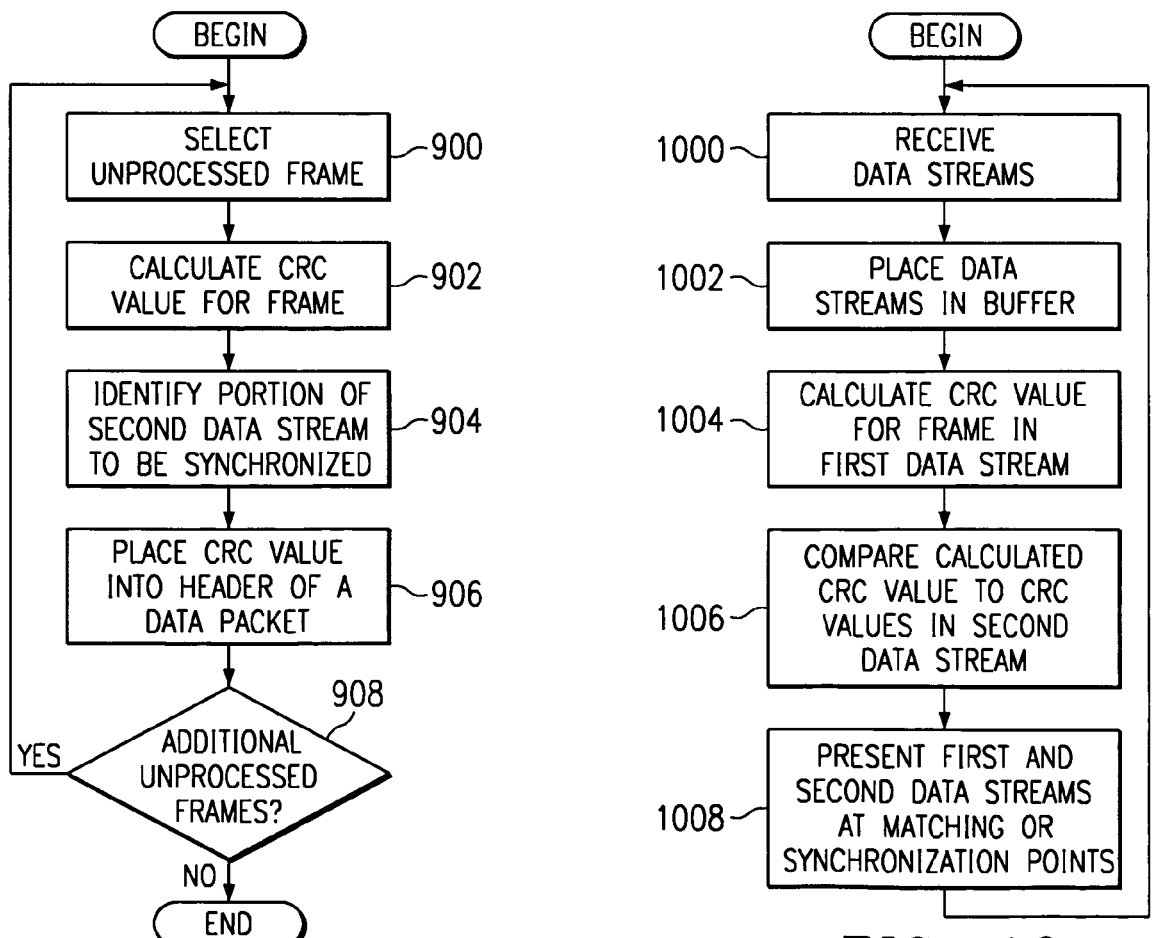
FIG. 9
FIG. 10

US 8,341,662 B1

USER-CONTROLLED SELECTIVE OVERLAY IN A STREAMING MEDIA

CROSS REFERENCE TO RELATED APPLICATIONS

The present invention is related to applications entitled METHOD AND APPARATUS FOR DYNAMIC DISTRIBUTION OF CONTROLLED AND ADDITIONAL SELECTIVE OVERLAYS IN A STREAMING MEDIA, Ser. No. 09/409,593; and METHOD AND APPARATUS FOR DYNAMIC DISTRIBUTION OF CONTROLLED AND ADDITIONAL SELECTIVE OVERLAYS IN A STREAMING MEDIA, Ser. No. 09/409,601, now abandoned; all of which are filed even date hereof, assigned to the same assignee, and incorporated herein by reference.

BACKGROUND OF THE INVENTION

1. Technical Field

The present invention relates to the field of computer software and, more particularly, to methods of providing streaming media to users.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Furthermore, the Internet has destroyed traditional geographic and technical barriers to distribution of multimedia content. Traditionally, multimedia content has been distributed via broadcast television (sometimes in combination with radio), moving pictures (film), and, more recently, cable television. Much of this multimedia content was only available within limited geographic areas and presented in one language.

To reach wider audiences and provide consumers with more choices, television broadcasts have employed SAP broadcasting in which a television broadcast contained audio tracks for several different languages for the same video content. However, SAP is an all or nothing choice. That is, a user must choose one audio track. The possibility of mixing several audio tracks together is non-existent using SAP.

Another method television broadcasters have used to provide users with more choices over the presentation of programming is "simulcast". With this technology, a different audio track was broadcast via radio to correspond to a simultaneously broadcast television program. However, this involved the use of two different media. Furthermore, only the whole of the audio sound track was broadcast, not pieces of it which could be selectively filtered. Additionally, this method did not contain any other video components and there was not a single point of control. "Simulcast" required two points of control: a television and a separate radio.

Currently, the potential is available for anyone anywhere in the world to view content being broadcast from anywhere in the world. This potential needs to be realized and requires a new technology to reduce overall bandwidth while providing viewer centric content as a way of differentiating a broadcaster from his competition in the world market. Also, to encourage viewers to watch an event or program it is desirable to appeal to as many different types of viewers as possible. In some cases, events or programs may be broadcast in different languages. This type of customization typically requires a separate broadcast for each language. This type of customization requires bandwidth for the audio and video for each version. As a result, bandwidth is wasted by rebroadcasting an event for each versions. Thus, it would be advantageous to have an improved method and apparatus to allow customization of the presentation of events to fit the viewing patterns, wants, and needs of present day consumers and reduce bandwidth needed to customize events.

SUMMARY OF THE INVENTION

The present invention provides a method and apparatus for tailoring a multimedia presentation of an event on a computerized multimedia system. A set of video streams, a set of audio streams and a set of information streams are provided for the event via a network coupled to the computerized multimedia system. Video streams are selected for presentation from the set of video streams for the event. Audio streams are selected for presentation from the set of audio streams for the event. Information streams are selected for presentation from the set of information streams for the event. Responsive to user input, selected video streams and the selected audio streams are assigned to respective portions of video and audio output devices. The event is presented according to selected video stream and audio stream assignments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A-7D are diagrams illustrating data structures contained within data streams sent to a client depicted in accordance to a preferred embodiment of the present invention;

FIG. 9 is a flowchart of a process for generating CRC values for use in synchronizing data streams depicted in accordance with a preferred embodiment of the present invention; and FIG. 10 is a flowchart of a process for synchronizing data streams using CRC data depicted in accordance with a preferred embodiment of the present invention.

DETAILED DESCRIPTION OF THE PREFERRED EMBODIMENT

Figure 1:
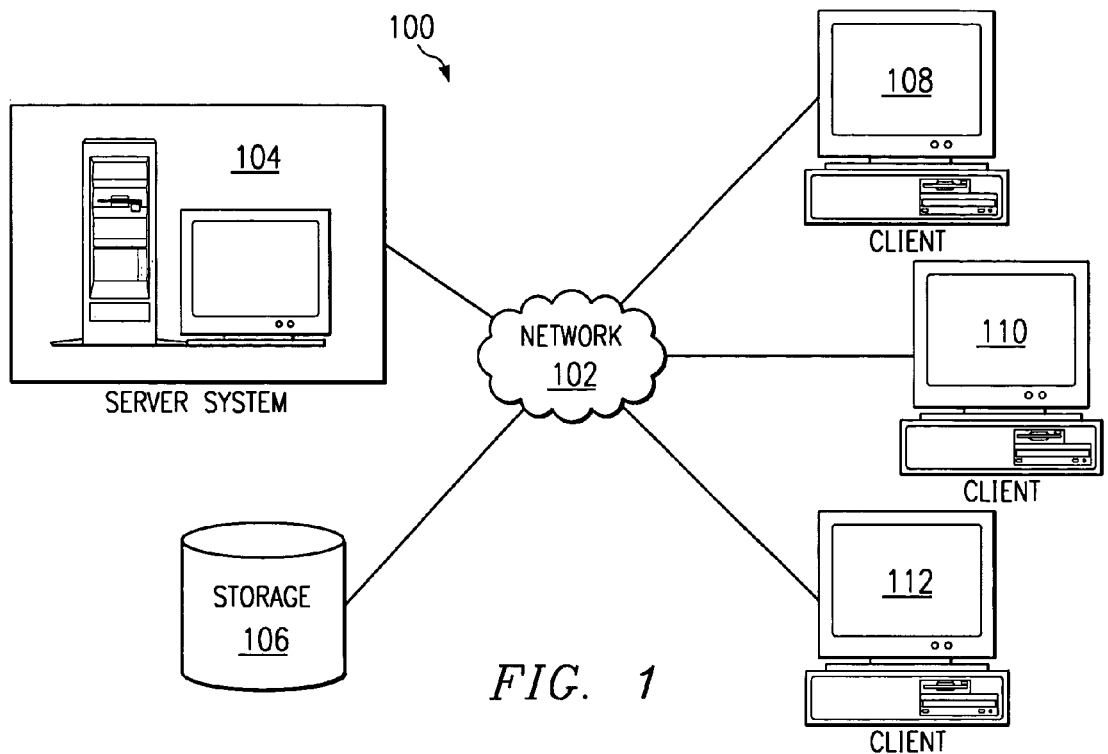
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server system 104 is connected to network 102, along with storage unit 106. Server system 104 may contain one or more server computers for providing data streaming. For example, a server may be used to administer and control data streams while another server within server system 104 is employed to originate resource data streams to clients. The information in these data streams may be stored within server system 104 or on a remote storage device, such as storage device 106. In addition, clients 108, 110 and 112 are also connected to network 102. These clients, 108, 110 and 112, may be, for example, without limitation, personal computers, set top boxes, web TV units, or any other hardware unit for receiving data streams. Clients 108, 110 and 112 are clients to server system 104. In the depicted example, server system 104 provides data streams to clients 108-112. Distributed data processing system 100 may include additional servers, clients, and other devices not shown.

Clients 108, 110, and 112 include mechanisms for mixing and filtering data streams received from server system 104 or other server systems not shown. These mechanisms may be implemented in hardware, software, firmware, or some combination thereof in the depicted examples.

Distributed data processing system 100 may be, for example, the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages.

Another implementation for network 102 is as a broadband network, also referred to as a broadband integrated services digital network (BISDN). In such a network, broadband services typically provide channels capable of supporting data transmission rates of greater than 1.5 Mbps or a primary rate in integrated services digital network (ISDN), T1, or DS1. In broadband system, the type of transfer mode typically is a synchronous transfer mode (ATM) with the use of synchronous optical network (SONET) and intelligent network (IN) technologies as providing the framework for ISDN. In such a network, information including voice, data, video, and audio are transferred through the network to various clients.

Further, network 102 also may be a cable communications system depending on the implementation. Of course, distributed data processing system 100 also may be implemented as a number of different types of networks such as, for example, an intranet or a local area network. FIG. 1 is intended as an example and not as an architectural limitation for the processes of the present invention.

Figure 2:
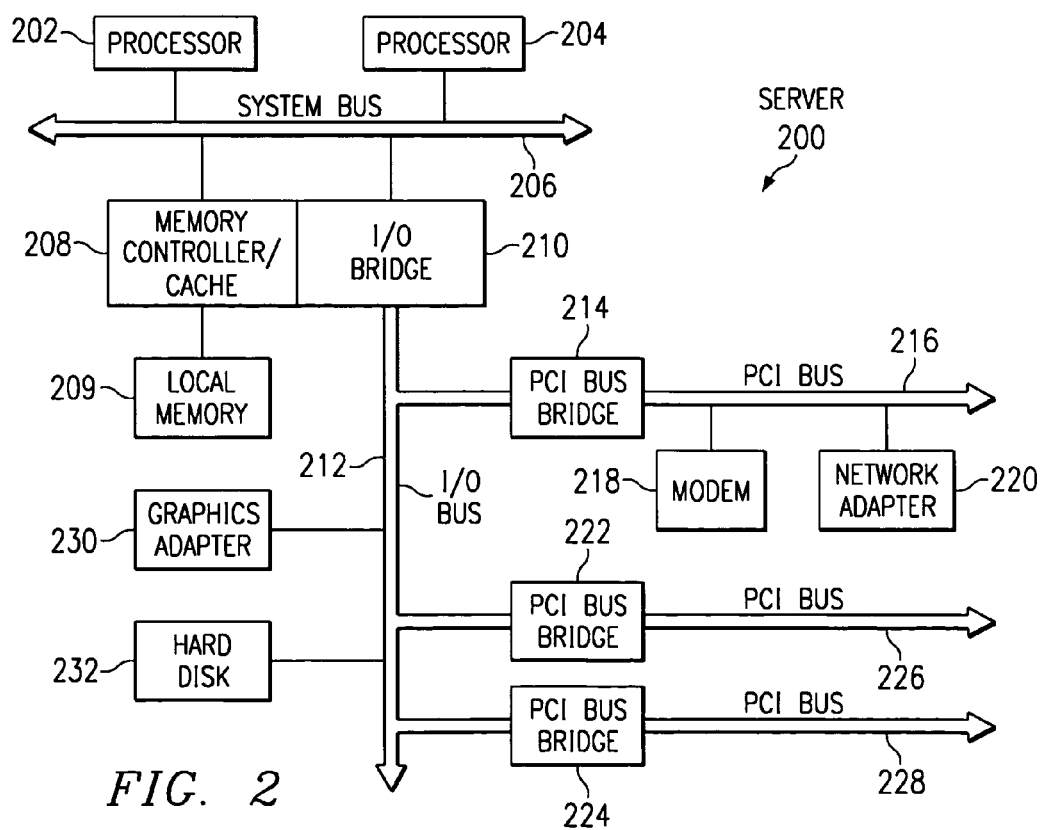
FIG. 2 depicts a block diagram of a data processing system which may be implemented as a server in accordance with the present invention.

Referring to FIG. 2, a block diagram of a data processing system, which may be implemented as a server system, such as server system 104 in FIG. 1, is depicted in accordance with the present invention. Data processing system 200 may be employed as a video server or other application server within a server system.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
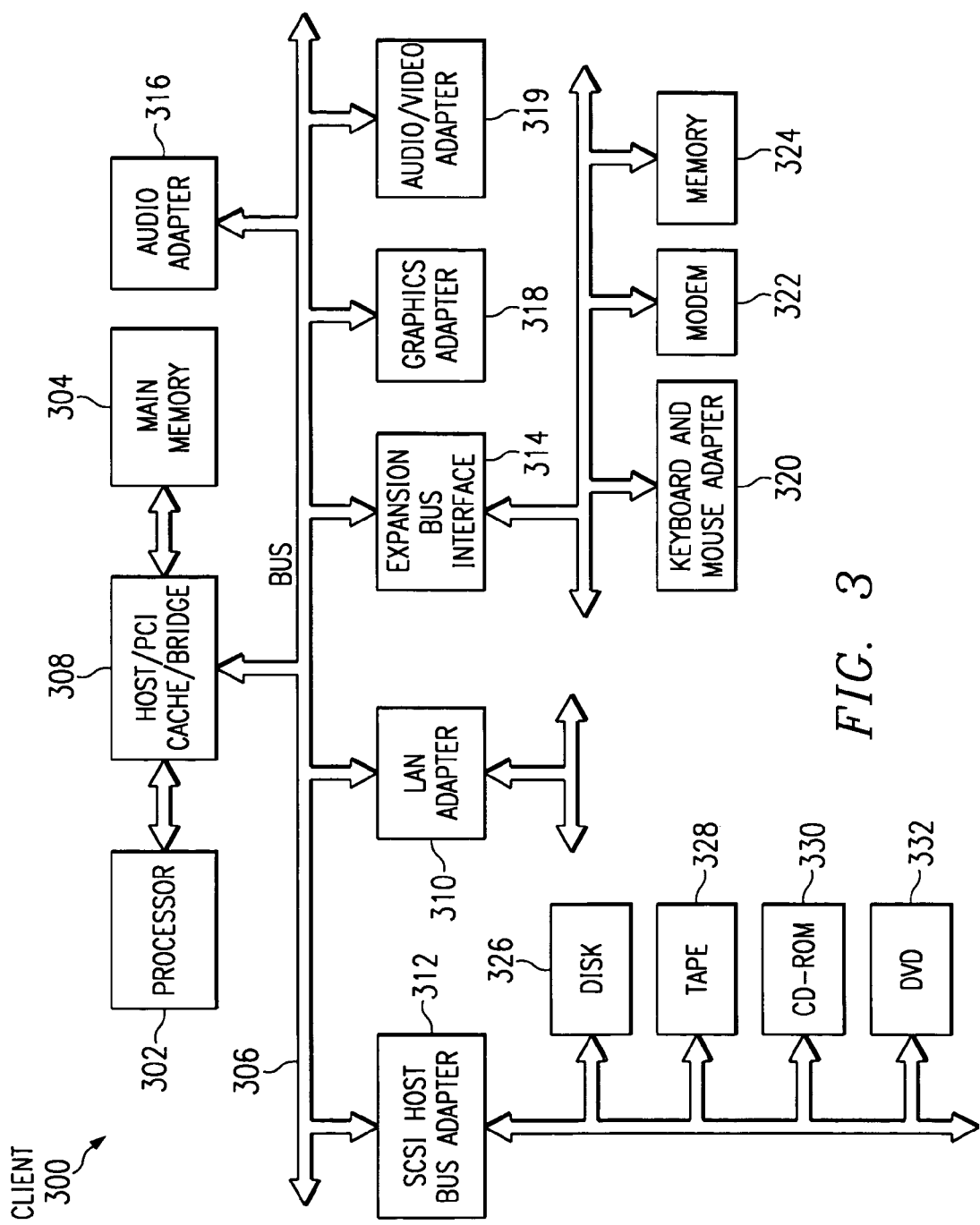
FIG. 3 depicts a block diagram of a data processing system in which the present invention may be implemented.

With reference now to FIG. 3, a block diagram of a data processing system in which the present invention may be implemented is illustrated. Data processing system 300 is an example of a computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems. Additionally, data processing system 300 may take the form of a notebook computer or a personal digital assistant (PDA). Further, the data processing system may be, for example, without limitations, a television or settop cable box containing appropriate hardware and software for implementing processes of the present invention.

The present invention provides a method, apparatus, and computer implemented instructions for decreasing bandwidth usage and for providing increased client customization of programs or events. The mechanism of the present invention is directed towards tailoring a multimedia presentation on a multimedia data processing system. This is accomplished by breaking up a program or event into different data streams for different audio and video components. Additional optional data streams may be added to allow for customization of the program or event. A data processing system may receive a set of video and audio streams associated with a program or event. These data streams may be selectively presented based on user input. Depending on the user input, some portions of the video and audio data streams may be presented while others are omitted. Further, user input may selectively place a video stream on a display. Also, information streams containing text and/or graphics may be received and selectively displayed in association with the presentation of the program or event. The combination of these data streams at the user site provides for customization without requiring broadcasting of multiple versions of an event to viewers.

By allowing a viewer to customize a program or event, bandwidth usage may be reduced because program originators do not have to broadcast multiple versions of a program or event for different geographical regions or different viewer basis.

Figure 4:
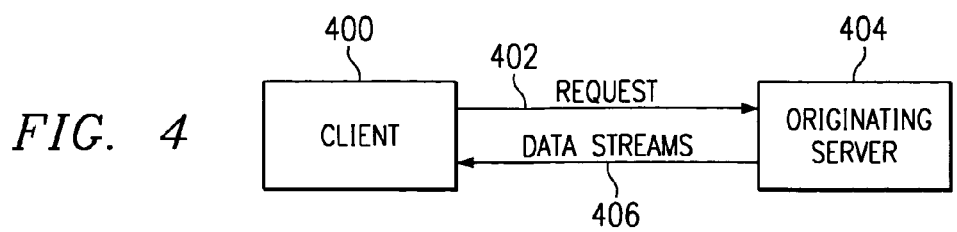
FIG. 4 shows a block diagram broadly illustrating the process of the present invention.

Turning now to FIG. 4, there is shown a block diagram broadly illustrating the process of the present invention. A client 400, such as data processing system 300 in FIG. 3, sends a request 402 for programming content to an originating server 404. Originating server 404 is a data processing system, such as data processing system 200 in FIG. 2, and is the host for the programming content requested by client 400. Originating server 404 sends the requested programming as a set of data streams 406 back to client 400. Data streams 406, may be used to present programming or events to a user at client 402. Furthermore, data streams 406 may comprise one or more video stream components, one or more information stream components, and one or more audio stream components.

Client 400 and originating server 404 have been described and illustrated in FIG. 4 as though they are directly connected. However, client 402 and originating server 404 are preferably part of a distributed data processing system such as distributed data processing system 100 and are linked together via a network, such as network 102 in FIG. 1.

Figure 5:
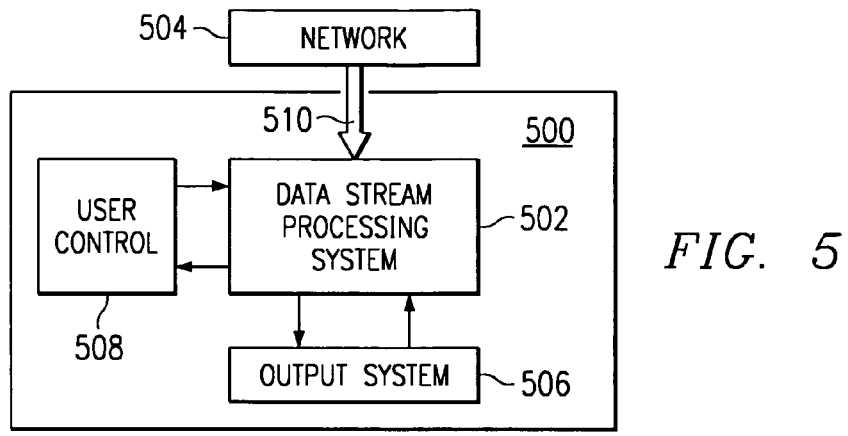
FIG. 5 is a block diagram of functional components used in the selection of media streams depicted in accordance with the present invention.

Turning next to FIG. 5, a block diagram of functional components used in the selection of media streams in accordance with the present invention is depicted. In this example, client 500 includes a data stream processing system 502 to receive data streams 510 from a network 504 for output to output system 506. The selection of data streams received from network 504 are controlled through user control 508, which controls data stream processing system 502.

Multiple data streams may be received from network 504 through connection 508. These data streams may be, for example, audio, video, text, graphics, or other information that may be displayed through output system 506 to a user of client 500. Selection filtering of data streams from network 504 by data stream processing system 502 are controlled through user control 508. The selected data stream or selected portions of data streams are displayed to user through output system 506, which may be used to drive displays and audio output devices, such as a high definition television or speakers.

Figure 6:
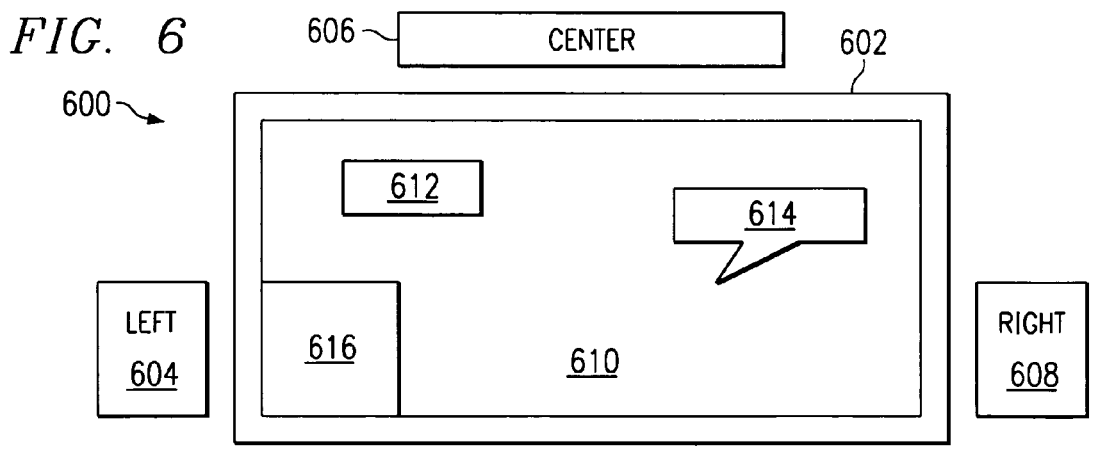
FIG. 6 is a diagram illustrating an example display depicted in accordance with a preferred embodiment of the present invention.

With reference now to FIG. 6, a diagram illustrating an example display is depicted in accordance with a preferred embodiment of the present invention. In this example, a presentation system 600 is presented with a display unit 602, audio sources 604, 606, and 608. Presentation system 600 is the part of a client through which the user sees and hears programs. In this example, audio source 604 is a left speaker while audio source 608 is a right speaker. Audio source 606 is the center speaker in this example. The video 610 is displayed in display 602 with text box 612, text box 614, and video 616. Video 610 is the primary data stream in this example with text box 612 and text box 614 being overlaid over video 610.

Text box 612 and text box 614 are generated from two data streams in this example. Text box 612 is a stationary text box, which may be used to provide information, such as statistics about the program, upcoming programs, or any other information the user may select. Text box 614 in this example is a "pop-up," which may be used to provide information about a particular object or person in video 610.

Additionally, the data packets in text box 614 may include data to reposition text box 614 to follow a particular object or person. Video 616 is displayed using another data stream to provide additional viewing for the user. For example, video 616 may provide different perspectives in the program or may illustrate scene not currently displayed within video 610. Initially, the user may select various audio streams for feed through 604, 606, and 608. For example, if the programming being displayed is a sporting event, the user might select a particular player and have audio information about that player played over 608 or have direct feeds from a microphone located on the player played through 604.

By way of example, consider a football game being broadcast across the Internet or a broadband network. The end user is able to select from and mix several audio streams. For example, the quarterback microphone of either team, the coach's microphone of either team, and/or the announcers, of which, there could be several (e.g., John Madden, Phil Simms, Howie Long, Bruce Beadle, Michael Paolini, etc.). In this manner, the user is able to tune-out (deselect) John Madden if they find him offensive. The user might instead choose to listen to the Quarterback microphone of the 49er's (or the opposing team, or another announcer of their choice, or to listen in another language entirely) without having to change the channel/coverage.

Carrying the football example further, with the present invention, it is possible to have a separate audio track for viewers that are new to the sport. This separate audio track would explain the rules of the game and what is happening in additional detail. It would also explain the technical jargon particular to football. The user may choose to have this additional information presented as a text stream.

In yet another example of the use of the present invention, continuing with the football theme, the user could place team A's player voices on the right channels with team B's player voices on the left channels and the announcers' voices on the rear channels. Furthermore, the user could select the player with the ball such that this player's voice is always on the center channel.

One primary data stream representing the video (which does not change no matter which audio overlay streams are selected), and many small add-on data streams representing audio or video overlays may be used to present the program. These streams could be mixed together or assigned to channels (right, left, rear, center, etc.) and/or 3-D positional locations using the latest "Dolby Digital" from Dolby Laboratories and other similar technologies. In addition, the volume could be adjusted on a per-overlay basis. More information on technologies, such as "Dolby Digital" may be found in U.S. Pat. No. 5,912,976.

With respect to video overlays, several video overlays can also be streamed and selected in a manner similar to the audio streaming and mixed to "overlay" the final video. If, for example, the desired overlay was a balloon shaped pop-up at a certain video display position containing some text, then the additional overlay stream would not have to be video itself, but rather the information to create the overlay video. Therefore, the size of the data stream would be much, much smaller than a primary video stream. Additionally, unrelated information in addition to the data streams selected for an event, such as, for example, stock market data or news headlines also may be provided to the user. If, for example, the event or programming being viewed is that of a football game, it is possible to have a video overlay stream dedicated to displaying pop-up balloons with data, such as statistics on players in which these pop-up balloons may appear over the players themselves. Additionally, betting odds, other interesting facts about the players, or rules and information about events may be displayed in this manner. Another type of data stream may include embedded pictures of players with biographies tagged on as well.

For other types of programming, other pop-up windows may be provided. For example, for a murder mystery show, pop-up windows giving clues about future events may be displayed or facts about actors, the script, or director also may be displayed in association with the program. In the case of a murder mystery show, different levels of clues may be provided depending the selection made by the user.

In this manner, in the context of the football game example, it is possible to have video overlay streams dedicated to displaying pop-up balloon(s) with data such as: statistics on players (they very well might appear over the players themselves), betting odds, odd or interesting facts, information explaining what is happening and rules (for novices), a summary of different on-going sporting event data (such as scores and statistics from other games in progress), stock market data, and news headlines to provide but a few examples. Another stream type might contain embedded pictures of the players with bios tagged on as well.

In another embodiment, it is possible to make the overlays selectable. That is to say that the user might do the equivalent of "clicking" on one, to trigger additional overlay streams, or lock it in place. For example, selecting a player's "name overlay" might for example bring up an overlay with that player's biography. In a one-way system, this could be done by having an overlay channel which continually cycles through all the players biographies, and having the client "select" the one of interest at the time of broadcast.

Additionally, the user could select between the different options using their client and thus have a lot more control of the information they would like to see and hear during a broadcast.

Figure 7A:
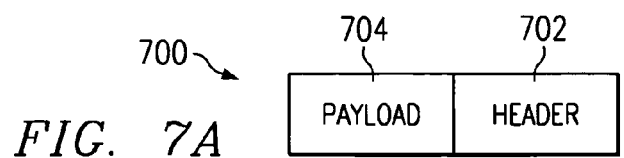

Turning now to FIGS. 7A-7D, diagrams illustrating data structures contained within data streams sent to a client are depicted in accordance with a preferred embodiment of the present invention. In FIG. 7A, a data packet 700 is shown in which the data packet includes a header 702 and a payload 704. Header 702 contains information used in routing and handling data contained within payload 704 of data packet 700.

Figure 7B:
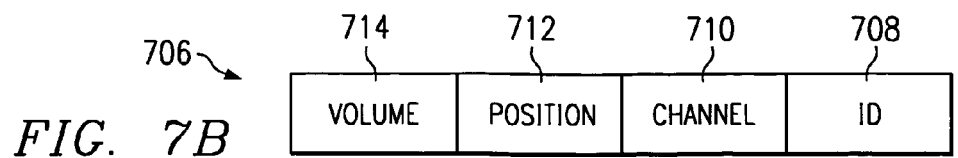

In FIG. 7B, an example of header information found within a data packet, such as data packet 700, is shown. In this example, header 706 includes an ID field 708, a channel field 710, a position field 712, and a volume field 714.

In this example, header 706 is a header identifying an audio packet. ID field 708 is used to identify the type of data packet. Channel field 710 in this example may be used to identify the channel or channels in which the data packet is to be presented to the user. For example, channel field 710 may be used to identify channels such as those in a surround system. The channels may be, in this example, right, left, rear, or center. Additionally, position field 712 also is included such that three dimensional positional locations using sound technologies such as Dolby Digital may be employed. This positional information may provide a default positioning that may be altered by a user. Volume field 714 is included to allow for adjusting the volume of the data in this data packet relative to other data packets to allow for overlays or emphasis for different data streams. Other fields may be used in addition to or in place of fields shown in header 706 for presenting audio information.

In FIG. 7C, a header 716 is an example of header information found in a video packet used in a video stream. In this example, header 716 includes an ID field 718, a time stamp field 720, and a CRC field 722. ID field 718 is used to identify the type of data contained within the packet, while time stamp 720 in this example is used for synchronization purposes. CRC field 722 may be used for error checking or synchronization purposes depending upon the implementation. If CRC field 722 is used for synchronization purposes, the CRC data is calculated for another data stream and placed within this field prior to being transmitted or broadcast to a viewer. The CRC data may be, for example, calculated for a frame or a portion of a frame in the other data stream. When this data stream and the other data stream are received, CRC data is calculated for a frame in the other data stream. This calculated CRC data is compared with the CRC data stored in CRC field 722. Matches between these CRC values are used to identify synchronization points between the two data streams.

Next, in FIG. 7D, another example of a header used for data packets in a video stream is illustrated. Header 724 includes an ID field 726, a type field 728, a location field 730, a duration field 732, and a z depth field 734. ID field 726 is used to identify the data packet as containing video data. Type field 728 in this example may be used to identify the type of video, such as text, or a frame in a moving video stream. Location field 730 may be used to identify the location on the screen at which the data is to be displayed. Duration field 732 may identify the amount of time the data is to be displayed. Z depth field 734 may be used to identify the depth or order in which the data is to be displayed relative to other video streams.

In the example, header 724 is an example of a header used for a video stream containing text to be displayed as a balloon or pop-up on the screen. In this case, duration field 732 identifies how long the text is to be displayed while the z depth field 734 identifies where the text is to be located with respect to other video streams. The z depth is used to determine the order in which video streams or overlays are displayed on the display. Location field 730 provides the xy location on the screen. In the text for display in the pop-up would be found in the payload. In this manner, a video overlay stream dedicated to displaying text, may be used along with moving video data streams.

The present invention also provides for selectability of these different data streams. For example, user may be able to press a selected button to trigger additional overlay streams or to lock one in place. For example, selecting a player's "name overlay" might bring up an overlay with that player's biography. In a one way system, this may be performed by having a overlay channel which continually cycles through all of the players' biographies and having the client machine select the one of interest at the time of broadcast. In this manner, user may select between different options and have more control on the information that the user desires to see and hear during a program. The selections may be implemented via a one way or two way communication depending on the bandwidth and type of network in use.

Overlay streams may be controlled from the server. In such a case, a command may be imbedded in an overlay or a set of commands may be imbedded to cause overlays to be selected or deselected on the client. Such a mechanism would allow for switching selected overlays off to broadcast an important event, and then resuming the previous programming.

Figure 8:
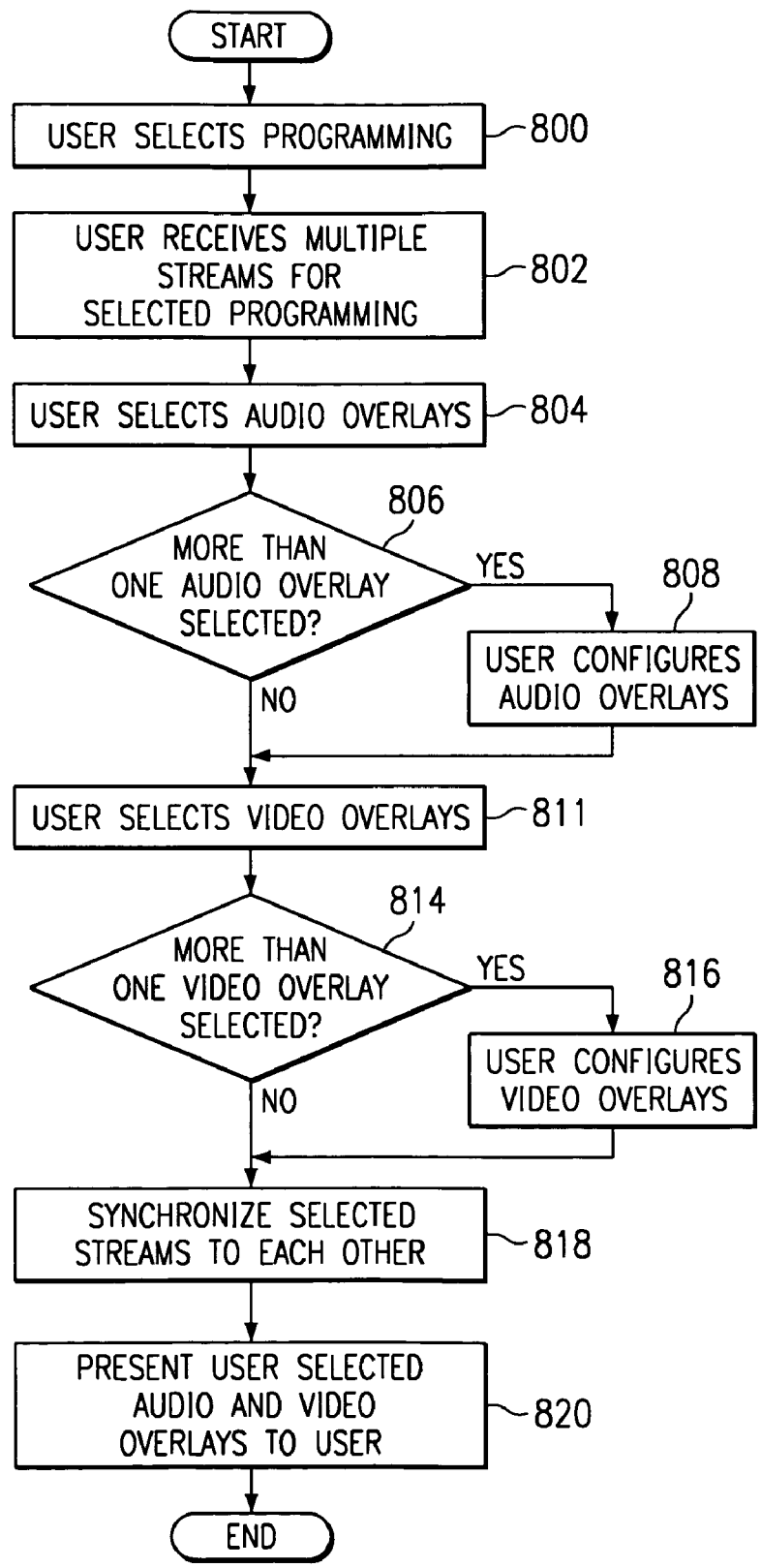
FIG. 8 is a flowchart of a process used to process data streams depicted in accordance with a preferred embodiment of the present invention.

Turning now to FIG. 8, a flowchart of a process used to process data streams is depicted in accordance with a preferred embodiment of the present invention. To start, a user selects programming to be retrieved from a distributed database (step 800). The user receives multiple video and audio streams corresponding to the selected program (step 802). The user selects audio streams (step 804), either directly in real time or through the use of user defined configurations, and, if more than one audio stream is selected (step 806), then the user configures the presentation profile for the selected audio streams (step 808). For example, if three audio streams are chosen, the user could configure the system to play one audio stream on the left channel, one audio stream on a center channel, and one audio stream on a right channel. Alternatively, the user could configure the presentation of the selected audio streams such that the volume of one audio stream is louder than the volume of the other two audio streams.

Next, the user selects, from the plurality of video streams received, one or more video streams to be displayed (step 811). If more than one video stream is selected (step 814), then the user configures the presentation of the multiple video streams (step 816). For example, one video stream could be presented on the left side of the video display and a second video stream could be presented on the right side of the video display. In another example, one video stream might occupy the entire video display screen, while a second video stream was placed in a smaller window within the first video stream. Also, video streams are configurable for such things as opacity and scaling, as well as other factors. Opacity is the semi-transparency as seen in menus overlaid on an event in which the event can be seen through the menu. Scaling may be employed to size display of a video stream on a display device.

Once the media streams are selected and configured by the user, the audio and video streams are synchronized to each other (step 818) and presented to the user in a user configured manner (step 820).

With reference again to step 806, if more than one audio stream is not selected, then the user selects, from the plurality of video streams received, one or more video streams to be displayed (step 811).

With reference again to step 814, if more than one video stream is not selected, the audio and video streams are synchronized to each other (step 818) and presented to the user in a user configured manner (step 820). Several mechanisms may be employed to synchronize the data streams. For example, a time stamp may be sent with each packet of data in each media stream, then each selected data stream is synchronized to be presented to the user such that data packets with identical time stamps are presented at the same time.

Each data stream also may contain a spike in the data that appears at a periodic rate. The spike in the data may be, for example, a data packet that contains no video or audio. Further, each data stream contains a larger spike that appears at a longer periodic rate. For example, the shorter spike may appear every 30 frames wherein the larger spike appears every 10 seconds. The selected data streams may be synchronized such that they are presented to the user such that the spikes appear in the data streams simultaneously. The longer spike enables the system to resynchronize itself periodically if the data streams have become separated by a period of one or two smaller data spikes.

In a third method of synchronization, cyclic redundancy check (CRC) values. Synchronizing data streams using a CRC data involves calculating CRC data for a first data stream and placing those calculated values in the headers of data packets in the second data stream. The CRC values are placed in data packets in the second data stream that should be synchronized with data packets in the first data stream.

Turning to FIG. 9, a flowchart of a process for generating CRC values for use in synchronizing data streams is depicted in accordance with a preferred embodiment of the present invention. The process illustrated is used for video streams, but may be applied to other types of data streams.

The process begins by selecting an unprocessed frame (step 900). This step selects the first unprocessed frame for content that will be transmitted as a data stream. A CRC value is then calculated for the frame (step 902). The CRC value may be calculated for an entire frame or different portions of the frame. For example, the CRC value may be based on the first five bytes of the frame, five bytes in the middle of the frame, and the last five bytes in the frame.

Next, the portion of a second data stream that is to be synchronized with this frame is identified (step 904). The CRC value is then placed into the header of a data packet for that portion of the data stream (step 906). A determination is then made as to whether additional unprocessed frames are present for processing (step 908). If additional unprocessed frames are present, the process returns to step 900. Otherwise, the process terminates.

The process in FIG. 9 may be used when the data streams are transmitted or broadcast. Alternatively, these processes may be initiated prior to transmitting or broadcasting a data stream. In such a case, the CRC values may be stored and added to the second data stream when that data stream is transmitted.

Turning now to FIG. 10, a flowchart of a process for synchronizing data streams using CRC data is depicted in accordance with a preferred embodiment of the present invention. The processes illustrated in FIG. 9 may be implemented at the viewer site to synchronize incoming data streams for presentation of a program or event.

The process begins by receiving data streams (step 1000). In step 1000, the data streams are received for presentation. These data streams are placed in a buffer prior to presentation (step 1002). A CRC value is calculated for a frame in the first data stream stored in the buffer (step 1004). Thereafter, the calculated CRC value is compared to CRC values in the second data stream stored in the buffer to identify a point in the second data stream containing a matching CRC value (step 1006). In the depicted examples, CRC values are placed within headers in the second data stream at points where the CRC value should match a calculated CRC value from a portion of the first data stream. Thereafter, the first and second data stream are presented at the matching or synchronization points (step 1008) with the process then returning to step 1000. The present invention could be implemented via one-way or two-way communication depending on the bandwidth of the network type in use.

Thus, the present invention provides a customized experience for a user. The present invention provides this customized experience by providing a number of different types of data streams, audio and video, which are delivered to a client in which the client may select from these data streams to customize the program or event being viewed by the user. Further, the present invention allows for decreasing the amount of bandwidth needed to provide customized programming. Currently, a data stream is created for each version or customization of a program transmitted to viewers in which the audio and video cannot be selectively modified. This advantage is provided by sending a set of data streams from which different users may select a subset of the data streams for customizing a program or event, rather than creating a new data stream in which audio and video are transmitted in an unmodifiable form for each desired customization of a program or event.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for user controlled selection of multimedia data streams for an event, the method comprising:
   receiving a set of video streams;
   receiving a set of audio streams;
   selecting a subset of the set of video streams;
   selecting a subset of the set of audio streams;
   responsive to user input to the data processing system, selecting a plurality of video streams from the video stream subset for the event, and one or more audio streams from the audio stream subset for the event, wherein the selecting step omits ones of the video stream subset while retaining the selected plurality of video streams, and omits ones of the audio stream subset while retaining other ones of the audio stream subset; and
   presenting each of the retained plurality of video streams concurrently with one another, and also concurrently with the retained other ones of the audio stream subset.

2. The method of claim 1, wherein the retained plurality of video streams are presented on a display simultaneously with one another, and the method includes altering a location in the display in which at least one video stream of the retained plurality of video streams is presented.

3. The method of claim 1, further comprising:
   selecting different selected ones of the set of video streams for presentation simultaneously with one another.

4. The method of claim 1, further comprising:
   selecting additional selected ones of the set of video streams for presentation simultaneously with one another.

5. The method of claim 1, further comprising:
   selecting different selected ones of the set of audio streams for presentation.

6. The method of claim 1, further comprising:
   selecting additional selected ones of the set of audio streams for presentation.

7. The method of claim 1 further comprising:
   receiving a set of information streams including text; and
   responsive to user input, selectively presenting selected ones of the set of information streams on a display.

8. The method of claim 1, wherein the set of video streams and the set of audio streams include time stamps and further comprising:
   synchronizing selected ones of the video stream with selected ones of the audio stream using the time stamps.

9. The method of claim 1, wherein the set of video streams and the set of audio streams include data packets located in the video and audio data streams periodically and further comprising:
   synchronizing selected ones of the video stream with selected ones of the audio stream using the data packets.

10. The method of claim 1, wherein the data processing system is a computer.

11. The method of claim 1, wherein the data processing system is a personal digital assistant.

12. The method of claim 1, wherein the data processing system is a television.

13. A method for tailoring a multimedia presentation of an event on a computerized multimedia system comprising the steps of:
providing a set of video streams, a set of audio streams and a set of information streams for the event via a network coupled to the computerized multimedia system;
receiving video streams for presentation from the set of video streams;
receiving audio streams for presentation from the set of audio streams;
receiving information streams for presentation from the set of information streams;
responsive to user input to the data processing system, selecting a plurality of the received video streams for the event, and also selecting one or more of the received audio streams for the event;
responsive to user input, assigning each video stream of the selected plurality of video streams and the selected audio streams to respective portions of video and audio output devices; and
presenting each video stream the selected plurality of video streams concurrently with one another for the event, and also concurrently with the selected audio streams.

14. The method of claim 13, wherein the step of selecting the plurality of video streams for presentation from the set of video streams for the event is performed in the computerized multimedia system.

15. The method of claim 13, wherein the step of selecting audio streams for presentation from the set of audio streams for the event is performed in the computerized multimedia system.

16. The method as recited in claim 13, wherein the set of video streams and the set of audio streams are provided from a first source.

17. The method as recited in claim 16, further comprising:
responsive to user selection, providing additional video streams from a second source.

18. The method as recited in claim 16, further comprising:
responsive to user selection, providing a second audio stream from a second source.

19. The method as recited in claim 13, wherein the set of video streams, the set of audio streams, and the set of information streams are provided from at least two different sources.

20. The method as recited in claim 13, wherein the set of video streams, the set of audio streams, and the set of information streams is provided via a broadband network.

21. A data processing system for user controlled selection of multimedia data streams for an event, the data processing system comprising:
first receiving means for receiving a set of video streams;
second receiving means for receiving a set of audio streams;
first selecting means for selecting a subset of the set of video streams;
second selecting means for selecting a subset of the set of audio streams;
means, responsive to user input to the data processing system, for selecting a plurality of video streams from the video stream subset for the event, and one or more audio streams from the audio stream subset for the event, wherein the selecting step omits ones of the video stream subset while retaining the selected plurality of video streams, and omits ones of the audio stream subset, while retaining other ones of the selected audio stream subset; and
first presenting means for presenting each of the retained plurality of video streams concurrently with one another, and also concurrently with the retained ones of the audio stream subset.

22. The data processing system of claim 21, further comprising:
altering means for altering a location in the display in which ones of the selected video streams are presented.

23. The data processing system of claim 21, further comprising:
third selecting means for selecting different selected ones of the set of video streams presentation.

24. The data processing system of claim 21, further comprising:
third selecting means for selecting additional selected ones of the set of video streams for presentation.

25. The data processing system of claim 21, further comprising:
third selecting means for selecting different selected ones of the set of audio streams presentation.

26. The data processing system of claim 21, further comprising:
third selecting means for selecting additional selected ones of the set of audio streams presentation.

27. The data processing system of claim 21 further comprising:
third receiving means for receiving a set of information streams including text; and
second presenting means, responsive to user input, selectively for presenting selected ones of the set of information streams on a display.

28. The data processing system of claim 21, wherein the set of video streams and the set of audio streams include time stamps and further comprising:
first synchronizing means for synchronizing selected ones of the video stream with the selected ones of the audio stream using the time stamps.

29. The data processing system of claim 21, wherein the set of video streams and the set of audio streams include data packets located in the video and audio data streams periodically and further comprising:
first synchronizing means for synchronizing selected ones of the video stream with selected ones of the audio stream using the data packets.

30. The data processing system of claim 21, wherein the data processing system is a computer.

31. The data processing system of claim 21, wherein the data processing system is a personal digital assistant.

32. The data processing system of claim 21, wherein the data processing system is a television.

33. A data processing system for tailoring a multimedia presentation of an event on a computerized multimedia system, the data processing system comprising:
first providing means for providing a set of video streams, a set of audio streams and a set of information streams for the event via a network coupled to the computerized multimedia system;
first selecting means for selecting video streams for presentation from the set of video streams;
second selecting means for selecting audio streams for presentation from the set of audio streams;
third selecting means for selecting information streams for presentation from the set of information streams;

fourth selecting means for, responsive to user input to the data processing system, selecting a plurality of the selected video streams for the event, and also selecting one or more of the selected audio streams for the event;

assigning means, responsive to user input, for assigning each video stream of the selected plurality of video streams and the selected audio streams to respective portions of video and audio output devices; and presenting means for presenting each video stream of the selected plurality of video streams concurrently with one another, and also concurrently with the selected audio streams.

34. The data processing system of claim 33, wherein the first selecting means includes selecting video streams for presentation from the set of video streams for the event is performed in the computerized multimedia system.

35. The data processing system of claim 33, wherein the second selecting means for selecting audio streams for presentation from the set of audio streams for the event is performed in the computerized multimedia system.

36. The data processing system as recited in claim 33, wherein the set of video streams and the set of audio streams are provided from a first source.

37. The data processing system as recited in claim 36, further comprising, responsive to user selection, providing a second video stream from a second source.

38. The data processing system as recited in claim 36, further comprising:

second providing means, responsive to user selection, for providing a second audio stream from a second source.

39. The data processing system as recited in claim 33, wherein the set of video streams, the set of audio streams, and the set of information streams are provided from at least two different sources.

40. The data processing system as recited in claim 33, wherein the set of video streams, the set of audio streams, and the set of information streams is provided via a broadband network.

41. A computer program product for user controlled selection of multimedia data streams for an event, the computer program product comprising:

a non-transitory computer readable recordable-type data storage medium having instructions stored thereon, the instructions comprising:

first instructions for receiving a set of video streams;

second instructions for receiving a set of audio streams;

third instructions for selecting a subset of the set of video streams;

fourth instructions for selecting a subset of the set of audio streams;

fifth instructions, responsive to user input to the data processing system, for selecting a plurality of video streams from the video stream subset for the event and one or more audio streams from the audio stream subset for the event, wherein the selecting step omits ones of the video stream subset while retaining the selected plurality of video streams, and omits ones of the audio stream subset, while retaining other ones of the audio stream subset; and sixth instructions for presenting each of the retained plurality of video streams concurrently with one another, and also concurrently with the retained other ones of the audio stream subset concurrently.

42. A computer program product for tailoring a multimedia presentation of an event on a computerized multimedia system comprising:

a non-transitory computer readable recordable-type data storage medium having instructions stored thereon, the instructions comprising:

first instructions for providing a set of video, audio and information streams for the event via a network coupled to the computerized multimedia system;

second instructions for receiving video streams for presentation from the set of available video streams;

third instructions for receiving audio streams for presentation from the set of available audio streams;

fourth instructions for receiving information streams for presentation from the set of available information streams;

fifth instructions for, responsive to user input to the data processing system, selecting a plurality of the received video streams for the event, and also selecting one or more of the received audio streams for the event;

sixth instructions, responsive to user input, for assigning each video stream of the selected plurality of video streams and the selected audio streams to respective portions of video and audio output devices; and seventh instructions for presenting each video stream of the selected plurality of video streams concurrently with one another for the event, and also concurrently with the selected audio streams.

\* \* \* \* \*